Dec. 2, 1952 D. J. NEAL 2,619,708
COMMUTATOR TURNING DOWN MACHINE AND MICA UNDERCUTTER
Filed Sept. 19, 1946 2 SHEETS—SHEET 1
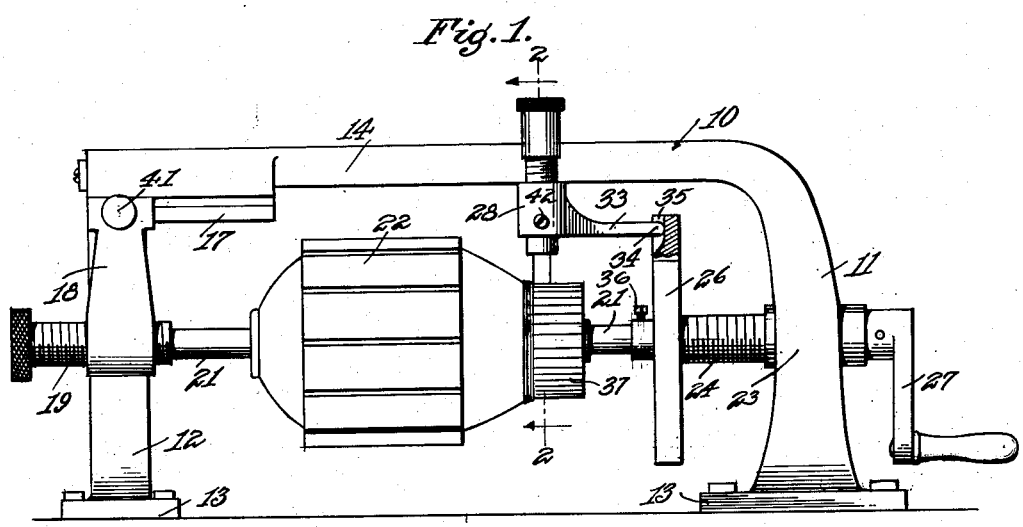
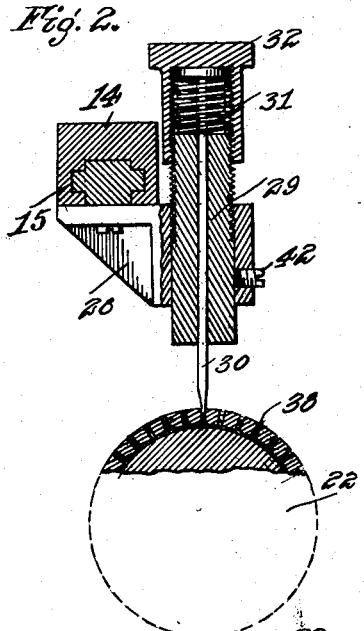
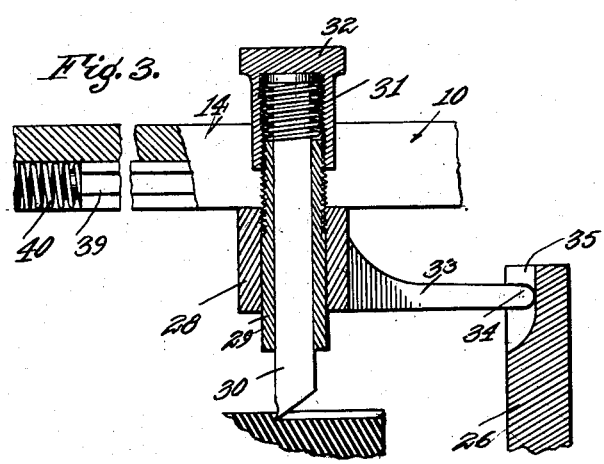
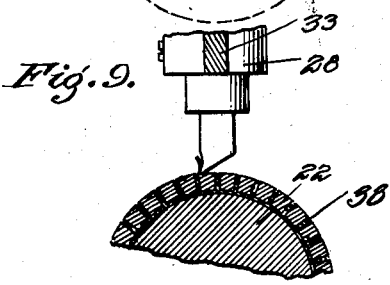
INVENTOR.
Donald J. Neal.
BY
Victor J. Evans & Co.
ATTORNEYS Dec. 2, 1952 D. J. NEAL 2,619,708
COMMUTATOR TURNING DOWN MACHINE AND MICA UNDERCUTTER
Filed Sept. 19, 1946 2 SHEETS—SHEET 2
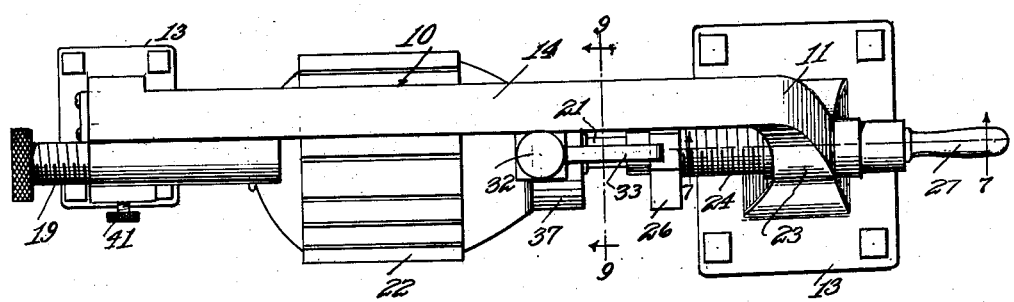
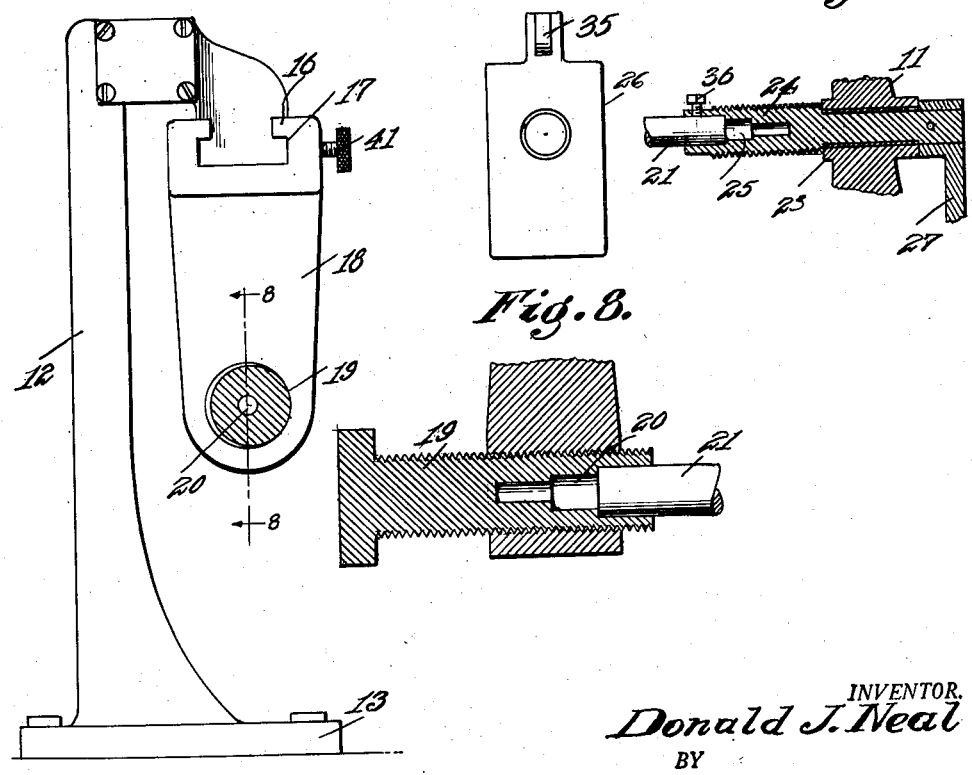
INVENTOR.
Donald J. Neal
BY
Victor J. Evans & Co.
ATTORNEYS Patented Dec. 2, 1952

2,619,708

UNITED STATES PATENT OFFICE 2,619,708

COMMUTATOR TURNING DOWN MACHINE AND MICA UNDERCUTTER

Donald J. Neal, Akron, Ohio

Application September 19, 1946, Serial No. 698,067

5 Claims. (Cl. 29—27)

The invention relates to a dressing machine, and more especially to an armature dressing and mica cutting apparatus.

The primary object of the invention is the provision of an apparatus of this character, wherein the armature of an electric motor or other like means can be dressed with accuracy and dispatch, while mica insulation can be undercut in a single mounting of the said motor or means within the apparatus, the latter being of novel construction and unique in its arranged parts.

Another object of the invention is the provision of an apparatus of this character, wherein the cutting tool is hand advanced for mica cutting, while the armature is hand rotated for the dressing of the commutator of the armature, the apparatus being adaptable for the mounting of varying sizes of armatures therein for the dressing of its commutator and the cutting of the mica inserts thereto.

A further object of the invention is the provision of an apparatus of this character, wherein its component parts are few, with resultant economy in repairs, the cutting tool being readily adjustable for the purposes intended thereof, and is regulated for the accurate setting thereof as well as the feed thereto to the work.

A still further object of the invention is the provision of an apparatus of this character, wherein the work can be placed therein and removed with ease and dispatch, and properly held in position for the several operations of such apparatus thereon.

A still further object of the invention is the provision of an apparatus of this character, which is simple in construction, thoroughly reliable and efficient in operation, strong, durable, readily and conveniently adjusted, hand controlled, thoroughly accurate in the working thereof, its parts being readily accessible, and positive in action, and inexpensive to manufacture and install.

With these and other objects in view the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings—

Figure 1 is a side view of the apparatus constructed in accordance with the invention with an armature mounted therein for its dressing.

Figure 2 is a sectional view taken on the line 2—2 of Figure 1 looking in the direction of the arrows.

Figure 3 is a fragmentary vertical longitudinal sectional view through the apparatus.

Figure 4 is a top plan view of the apparatus.

Figure 5 is an end elevation.

Figure 6 is a face view of the tool feed plate.

Figure 7 is a fragmentary sectional view taken on the line 7—7 of Figure 4.

Figure 8 is a sectional view taken on the line 8—8 of Figure 5.

Figure 9 is a sectional view taken on the line 9—9 of Figure 4 looking in the direction of the arrows.

Similar reference characters indicate corresponding parts throughout the several views in the drawings.

Referring to the drawings in detail, the apparatus constructed in accordance with the invention, comprises an inverted substantially U-shaped hanger frame 10, with its upright legs 11 and 12, respectively, provided with feet 13, which are secured in any manner upon a horizontal support. The legs 11 and 12 are integral with the cross connecting portion 14 therebetween of the frame 10, and this portion has a track 15 longitudinally therein.

A lateral bracket formation 16 is provided on the connecting portion 15 next to the leg 12, and this formation has a track 17 to which is slidably fitted an adjustable hanger 18 in which is adjustably threaded a horizontally disposed screw-like bearing or shaft 19, having stepped sockets 20 for receiving one end of the rotary shaft 21 of an armature 22 to be dressed by the apparatus.

Horizontally aligned with this bearing 19 and journalled in an off-set bearing 23 on the leg 11 is a feed screw 24, which is formed in its inner end with stepped sockets 25 for receiving the other end of the shaft 21, so that the armature 22 will be suspended in the frame 10, as best seen in Figures 1 and 4 of the drawings. The sockets 20 and 25 are for accommodating varying cross-sectional diameters of armature shafts, as should be obvious.

The feed screw 24 has threaded thereon, and drives, a feed plate 26, the said screw being fitted with a hand crank or handle 27 outside of the frame 10 for the turning of such screw.

In the track 15 is slidably fitted a hanger 28 forming a sleeve bracket for an adjustable vertically disposed tool holder 29, in which is carried the dressing or cutting tool 30, which is tensioned by a spring 31 confined within an adjusting head or cap 32 on the holder 29. The bracket 28 is provided with a horn 33 having its outer tip end 34 loosely seated or socketed into a notch 35 in the plate 26, as best seen in Figure 1 of the drawings, and in this manner the holder is fed by the screw 24 when hand turned. The end of the screw 24 receiving the shaft 21 of the armature 22 is provided with a set screw 36 which can lock or unlock the shaft 21 and the said screw 24. This shaft 21, when locked with the screw 24, will be caused to rotate therewith for the turning down or dressing of the commutator 37 of the armature 22, which is disclosed in Figures 1 and 9 of the drawings. When the shaft is unlocked from the screw 24 and the tool 30 is set for the under cutting of the mica insulation 38 from the commutator 37, this will be accomplished, as best seen in Figure 2 and 3 of the drawings.

Within the track 15 is a tensioned follower 39 for the bracket 28, and is tensioned by a spring 40, to hold the horn 33 constantly fitted to the feed plate 26 against the advancement of the latter by the screw 24.

The adjustment of the bearing 19 and the screw 24 permits different sizes of armatures to be hung in the frame 10 for the dressing thereof. The bearing hanger 18 is adjustably held by a set screw 41, while the holder 29 for the tool 30 is likewise adjustably held in the bracket 28 by a set screw 42.

On the dressing of the commutator 37 of the armature 22 by the tool 30, the latter is fed from the outermost end of such commutator in an inward direction of the frame 10, and simultaneously therewith the armature 22 is rotated by such screw 24 to which the shaft 21 has been locked. When the mica is under cut the armature remains stationary.

What is claimed is:

1. A machine tool for finishing commutator bars of armatures comprising an inverted U-shaped frame having an upper horizontally disposed cross-bar with vertically disposed legs at the ends, a horizontally disposed elongated bearing having an armature shaft receiving socket in the inner end adjustably mounted in one of the legs of the frame, a horizontally disposed feed screw having a crank on the outer end and an armature shaft receiving socket in the inner end rotatably mounted in the opposite leg of the frame and aligned with the said horizontally disposed bearing, a feed disc having a notch in the edge thereof threaded on said feed screw, and a tool holder carried by the said cross-bar of the frame and longitudinally slidable thereon, said tool holder having an arm extended therefrom and positioned with the end thereof in the notch of the feed disc.

2. A machine tool for finishing commutator bars of armatures comprising an inverted U-shaped frame having an upper horizontally disposed cross-bar with vertically disposed legs at the ends, a hanger suspended from the said cross-bar of the frame and longitudinally slidable thereon, a horizontally disposed elongated bearing having an armature shaft receiving socket in the inner end adjustably mounted in the lower end of the hanger, a horizontally disposed feed screw having a crank on the outer end and an armature shaft receiving socket in the inner end rotatably mounted in the opposite end of the frame and aligned with the said horizontally disposed bearing, a feed disc having a notch in the edge thereof threaded on said feed screw, and a tool holder carried by the said cross-bar of the frame and longitudinally slidable thereon, said tool holder having an arm extended therefrom and positioned with the end thereof in the notch of the feed disc.

3. A machine tool for finishing commutator bars of armatures comprising an inverted U-shaped frame having an upper horizontally disposed cross-bar with vertically disposed legs at the ends, a hanger suspended from the said cross-bar of the frame and longitudinally slidable thereon, a horizontally disposed elongated bearing having an armature shaft receiving socket in the inner end threaded in the lower end of the hanger, a horizontally disposed feed screw having a crank on the outer end and an armature shaft receiving socket in the inner end rotatably mounted in the opposite end of the frame and aligned with the said horizontally disposed bearing, a feed disc having a notch in the edge thereof threaded on the said feed screw, and a tool holder carried by the said cross-bar of the frame and longitudinally slidable thereon, said tool holder having an arm extended therefrom and positioned with the end thereof in the notch of the feed disc.

4. A machine tool for finishing commutator bars of armatures comprising an inverted U-shaped frame having an upper horizontally disposed cross-bar with vertically disposed legs at the ends, a hanger suspended from the said cross-bar of the frame and longitudinally slidable thereon, a horizontally disposed elongated bearing having and armature shaft receiving socket in the inner end threaded in the lower end of the hanger, a horizontally disposed feed screw having a crank on the outer end and an armature shaft receiving socket in the inner end rototably mounted in the opposite end of the frame and aligned with the said horizontally disposed bearing, means for selectively locking an armature shaft in the said armature receiving socket, a feed disc having a notch in the edge thereof threaded on the said feed screw, locking means on the said feed screw for securing an armature shaft in the said armature shaft receiving socket for selectively rotating the armature shaft with the feed screw and rotating the feed screw independent of the shaft, and a tool holder carried by the said cross-bar of the frame and longitudinally slidable thereon, said tool holder having an arm extended therefrom and positioned with the end thereof in the notch of the feed disc.

5. A machine tool for finishing commutator bars of armatures comprising an inverted U-shaped frame having an upper horizontally disposed cross-bar with vertically disposed legs at the ends, a hanger suspended from the said cross-bar of the frame and longitudinally slidable thereon, a horizontally disposed elongated bearing having an armature shaft receiving socket in the inner end threaded in the lower end of the hanger, a horizontally disposed feed screw having a crank on the outer end and an armature shaft receiving socket in the inner end rotatably mounted in the opposite end of the frame and aligned with the said horizontally disposed bearing, means for selectively locking an armature shaft in the said armature receiving socket, a feed disc having a notch in the edge thereof threaded on the said feed screw, locking means on the said feed screw for securing an armature shaft in the said armature shaft receiving socket for selectively rotating the armature shaft with the feed screw and rotating the feed screw independent of the shaft, a tool holder carried by the said cross-bar of the frame and longitudinally slidable thereon, said tool holder having an arm extended therefrom and positioned with the end thereof in the notch of the feed disc, means adjustably mounting a tool in the said tool holder, and resilient means in the tool holder for urging a tool upwardly therein.

DONALD J. NEAL.

REFERENCES CITED

The following references are of record in the file of this patent:

UNITED STATES PATENTS

| Number | Name | Date |
|---|---|---|
| 1,403,370 | Arkarberg | Jan. 10, 1922 |
| 1,464,760 | Hadden | Aug. 14, 1923 |
| 1,767,151 | McCord | June 24, 1930 |
| 1,874,491 | Fritschi | Aug. 30, 1932 |
| 1,923,410 | Zimmerman | Aug. 22, 1933 |
| 1,923,416 | Blomgren | Aug. 22, 1933 |
| 2,134,151 | Schoenfeld | Oct. 25, 1938 |
| 2,187,874 | Burrows et al. | Jan. 23, 1940 |
| 2,308,671 | Bowker | Jan. 19, 1943 |
| 2,407,341 | Meyers | Sept. 10, 1946 |
| 2,409,158 | Simpson et al. | Oct. 8, 1946 |